(12) United States Patent
Qin et al.

(10) Patent No.: US 8,995,072 B1
(45) Date of Patent: Mar. 31, 2015

(54) SERVO SYSTEM WITH SIGNAL TO NOISE RATIO MARGINALIZATION

(71) Applicant: LSI Corporation, San Jose, CA (US)

(72) Inventors: Dahua Qin, Allentown, PA (US); Xun Zhang, Westford, MA (US); Lu Lu, San Jose, CA (US); Haitao Xia, San Jose, CA (US); Jianzhong Huang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/135,984

(22) Filed: Dec. 20, 2013

Related U.S. Application Data

(60) Provisional application No. 61/913,854, filed on Dec. 9, 2013.

(51) Int. Cl.
| | |
|---|---|
| G11B 5/09 | (2006.01) |
| G11B 27/36 | (2006.01) |
| G11B 21/02 | (2006.01) |
| G11B 5/596 | (2006.01) |

(52) U.S. Cl.
CPC .............. *G11B 5/09* (2013.01); *G11B 5/59688* (2013.01)
USPC .................................. 360/39; 360/31; 360/75

(58) Field of Classification Search
None
See application file for complete search history.

(56) References Cited

U.S. PATENT DOCUMENTS

| | | | |
|---|---|---|---|
| 7,929,238 B1 | 4/2011 | Vasquez | |
| 2011/0157737 A1 | 6/2011 | Grundvig et al. | |
| 2012/0106607 A1 | 5/2012 | Miladinovic et al. | |
| 2012/0124241 A1 | 5/2012 | Yang et al. | |
| 2014/0160592 A1* | 6/2014 | Lu et al. ........................ | 360/65 |
| 2014/0254041 A1* | 9/2014 | Lu et al. ........................ | 360/39 |

OTHER PUBLICATIONS

Unpublished, U.S. Appl. No. 14/106,537, filed Dec. 13, 2013 Rui Cao.
Unpublished, U.S. Appl. No. 14/055,886, filed Oct. 17, 2013 Xiufeng Song.
Unpublished, U.S. Appl. No. 13/886,049, filed May 2, 2013 Xun Zhang.
Unpublished, U.S. Appl. No. 13/777,937, filed Feb. 26, 2013 Rui Cao.
Unpublished, U.S. Appl. No. 13/773,886, filed Feb. 22, 2013 Dahua Qin.
U.S. Appl. No. 13/491,135, Unpublished (filed Jun. 7, 2012) (Xun Zhang).
Unpublished, U.S. Appl. No. 13/490,913, filed Jun. 7, 2012 Xun Zhang.

* cited by examiner

*Primary Examiner* — Regina N Holder
(74) *Attorney, Agent, or Firm* — Hamilton DeSanctis & Cha

(57) ABSTRACT

A servo system includes a detector circuit operable to apply a data detection algorithm to digital data to yield hard decisions, a convolution circuit operable to yield ideal digital data based on the hard decisions and on target values, a subtraction circuit operable to subtract the ideal digital data from the digital data to yield an error signal, a scaling circuit operable to scale the error signal to yield a scaled noise signal, an adder operable to add the scaled noise signal to the digital data to yield noise-added digital data, and a second detector circuit operable to apply a second data detection algorithm to the noise-added digital data to yield output hard decisions.

20 Claims, 3 Drawing Sheets

SERVO SYSTEM WITH SIGNAL TO NOISE RATIO MARGINALIZATION

CROSS REFERENCE TO RELATED APPLICATIONS

The present application claims priority to (is a non-provisional of) U.S. Pat. App. No. 61/913,854, entitled "Servo System With Signal To Noise Ratio Marginalization", and filed Dec. 9, 2013 by Qin et al, the entirety of which is incorporated herein by reference for all purposes.

FIELD OF THE INVENTION

Various embodiments of the present invention provide systems and methods for identifying servo system signal to noise ratio error margins.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. The location of data stored on the storage medium can be detected using servo data stored on the storage medium.

SUMMARY

Various embodiments of the present invention provide systems, apparatuses and methods for identifying servo system signal to noise ratio error margins.

In some embodiments, a servo system includes a detector circuit operable to apply a data detection algorithm to digital data to yield hard decisions, a convolution circuit operable to yield ideal digital data based on the hard decisions and on target values, a subtraction circuit operable to subtract the ideal digital data from the digital data to yield an error signal, a scaling circuit operable to scale the error signal to yield a scaled noise signal, an adder operable to add the scaled noise signal to the digital data to yield noise-added digital data, and a second detector circuit operable to apply a second data detection algorithm to the noise-added digital data to yield output hard decisions.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

In the servo system with signal to noise ratio marginalization, scaled noise is added to the servo system during testing to help determine the error margins, ensuring that the servo system operates properly for different channel conditions. The term "marginalization" is used herein to refer to the process of adding scaled noise to a readback signal in a servo system to facilitate in determining the signal to noise ratio margins of the system. Using noise scaling, the level of signal to noise ratio degradation introduced into the servo system can be controlled to better test the signal to noise ratio margins for different channel conditions. A peak detection decision is used to select the scaled noise to be added to a readback signal before processing the result in a data detector. In some embodiments, the scaled noise is introduced by adding errors after processing existing error based on the sampled readback signal or Y samples and on the ideal readback signal or Y ideal values. The Y ideal values in some of these embodiments are selected from a lookup table based on peak detection decisions before adding scaled noise and subsequent data detection. In this way, the Y ideal selection is not affected by the noise scaling. In some embodiments, multiple noise scaling modes are provided.

Figure 1:
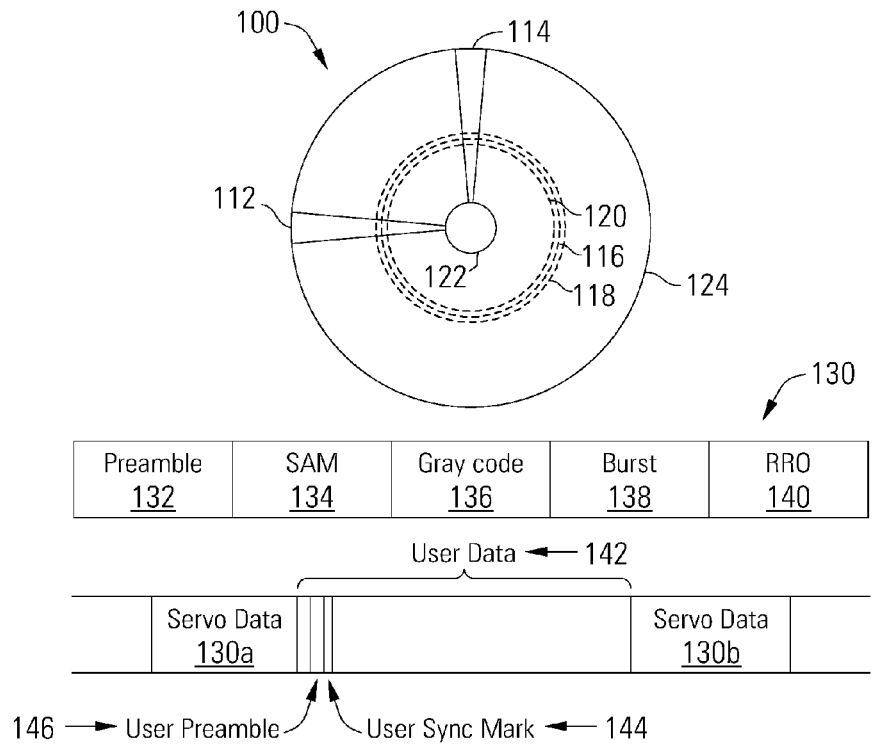
FIG. 1 is a diagram of a magnetic storage medium and sector data scheme that can be used with a servo system with signal to noise ratio marginalization in accordance with some embodiments of the present invention.

Turning to FIG. 1, a magnetic storage medium 100 is shown with an example data track 116 and its two adjacent neighboring data tracks 118, 120, indicated as dashed lines. The tracks 116, 118, 120 are segregated by servo data written within servo wedges 112, 114. It should be noted that while three tracks 116, 118, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark 134, a Gray code 136, a burst field 138, and a repeatable run-out (RRO) field 140. In some embodiments, a servo data set has two or more fields of burst information. It should be noted that different information can be included in the servo fields. Between the servo data bit patterns 130a and 130b, a user data region 142 is provided. User data region 142 can include one or more sets of data that are stored to storage medium 100. The data sets can include user synchronization information some of which may be used as a mark to establish a point of reference from which processing of the data within user data region 142 may begin.

Using the servo system with signal to noise ratio marginalization, the signal to noise ratio performance margin can be determined to ensure that the servo system is able to process the servo data in different channel conditions.

In operation, storage medium 100 is rotated in relation to a sensor that senses information from the storage medium. In a read operation, the sensor would sense servo data from wedge 112 (i.e., during a servo data period or "servo gate") followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146.

As used herein, the phrase "sync mark" is used in its broadest sense to mean any pattern that may be used to establish a point of reference. Thus, for example, the different alternating sync mark patterns disclosed herein are used in some embodiments as user sync marks 144 as are known in the art, or for one or more portions of servo data bit patterns 130. Based upon the disclosure provided herein, one of ordinary skill in the art may recognize other sync marks that could be used in relation to different embodiments of the present invention.

Figure 2:
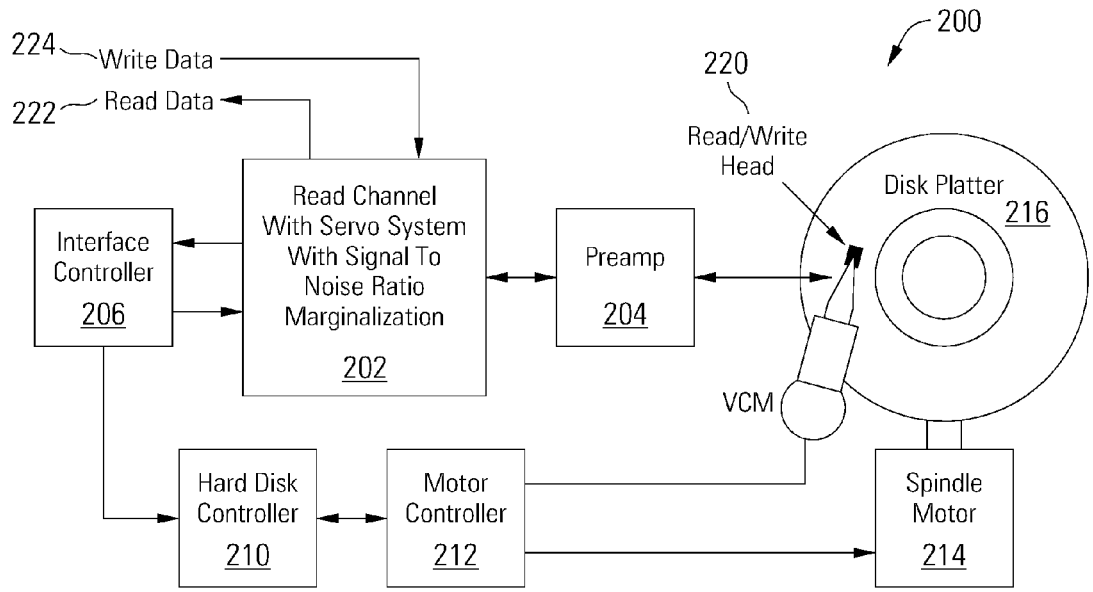
FIG. 2 depicts a storage system including a read channel with a servo system with signal to noise ratio marginalization in accordance with some embodiments of the present invention.

Turning to FIG. 2, a storage system 200 is disclosed which includes a read channel circuit 202 with a servo system with signal to noise ratio marginalization in accordance with some embodiments of the present invention. Storage system 200 can be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, read channel circuit 202 digitizes and decodes the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216.

During testing of the servo system in the read channel 202, signal to noise ratio marginalization is performed. Such servo system signal to noise ratio marginalization can be implemented consistent with that disclosed in relation to FIGS. 3-6. In some cases, servo system signal to noise ratio marginalization is performed consistent with the flow diagram disclosed in relation to FIG. 7.

It should be noted that in some embodiments storage system 200 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 200 is modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both a disk platter 216 and a solid state memory.

Figure 3:
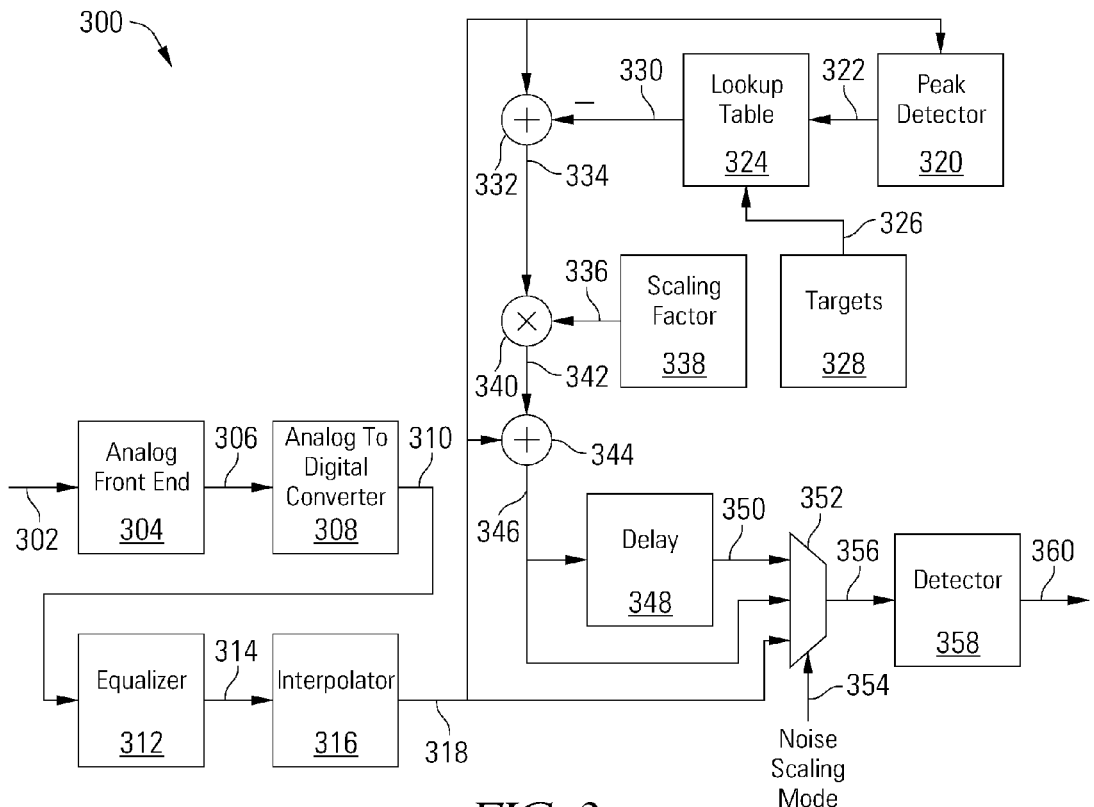
FIG. 3 depicts a servo system with signal to noise ratio marginalization in accordance with some embodiments of the present invention.

Turning to FIG. 3, a servo system 300 with signal to noise ratio marginalization is depicted in accordance with some embodiments of the present invention. The servo system 300 receives an analog signal 302 read from the data track. Analog front end circuit 304 processes analog signal 302 and provides a processed analog signal 306 to an analog to digital converter circuit 308. Analog front end circuit 304 can include, but is not limited to, a DC compensation circuit, an analog filter and an amplifier circuit as are known in the art. Based upon the disclosure provided herein, one of ordinary skill in the art will recognize a variety of circuitry that may be included as part of analog front end circuit 304. In some cases, analog input signal 302 is derived from a read/write head assembly (e.g., 220) that is disposed in relation to a storage medium (e.g., 216). Based upon the disclosure provided herein, one of ordinary skill in the art will recognize a variety of sources from which analog signal 302 may be derived.

Analog to digital converter circuit 308 converts processed analog signal 306 into a corresponding series of digital samples 310, or X samples. Analog to digital converter circuit 308 can be any circuit known in the art that is capable of producing digital samples corresponding to an analog input signal. Based upon the disclosure provided herein, one of ordinary skill in the art will recognize a variety of analog to digital converter circuits that can be used in relation to different embodiments of the present invention.

An equalizer circuit 312 receives digital samples 310 and applies an equalization algorithm to digital samples 310 to yield an equalized output 314, also referred to as Y samples, corresponding to the data track being read. In some embodiments of the present invention, equalizer circuit 312 is a digital finite impulse response filter circuit as are known in the art.

Equalized output 314 is provided to an interpolator 316, which effectively integrates and resamples the equalized output 314. In some embodiments, interpolator 316 changes the sampling rate and/or performs a phase offset or correction on equalized output 314. Based upon the disclosure provided herein, one of ordinary skill in the art will recognize a variety of interpolation circuits that can be used in relation to different embodiments of the present invention. The interpolator 316 yields interpolated Y samples 318 (also referred to herein as servo data).

A detector 320 is operable to apply a data detection algorithm to interpolated Y samples 318 to yield a hard decision output 322. In some embodiments of the present invention, detector 320 is a peak detector as is known in the art. In some of these embodiments, the interpolated Y samples 318 have actual values of either 1 or −1, and the peak detector 320 applies a threshold of 0 volts to each bit of the interpolated Y samples 318. If the incoming bit of interpolated Y samples 318 is greater than 0, the corresponding hard decision at hard decision output 322 is 1, and if the incoming bit of interpolated Y samples 318 is less than 0, the corresponding hard decision at hard decision output 322 is −1. Based upon the disclosure provided herein, one of ordinary skill in the art will recognize a variety of data detector circuits that can be used in relation to different embodiments of the present invention.

The hard decisions at hard decision output 322 are convolved with target values 326 (or servo system partial response targets) from a target register or memory 328 to yield Y ideals 330, which are ideal values of the interpolated Y samples 318. In some embodiments, the convolution is performed by a lookup table 324 that looks up predetermined Y ideal values based on the values of hard decision output 322 and target values 326. In some of these embodiments, only two bits are needed for indexing of the lookup table 324 to determine the Y ideals 330, one bit of the current hard decision from peak detector 320 and one bit of a previous decision from peak detector 320. The convolution can be performed in any other suitable manner, such as by real time calculation. Based upon the disclosure provided herein, one of ordinary skill in the art will recognize a variety of convolution circuits that can be used in relation to different embodiments of the present invention.

The Y ideals 330 are subtracted from interpolated Y samples 318 in subtraction circuit 332 to yield an error signal 334 representing the noise in the system. The error signal 334 is multiplied by a scaling factor 336 from a scaling factor memory or register 338 to yield a scaled noise signal 342. The scaled noise signal 342 is added to the interpolated Y samples 318 in adder 344, yielding marginalized Y samples 346 (also referred to herein as noise-added digital samples).

A delay circuit 348 delays marginalized Y samples 346 until the servo gate or servo period is over, yielding delayed marginalized Y samples 350. The delay circuit 348 can be any suitable circuit for delaying marginalized Y samples 346, such as, but not limited to, a first-in first-out buffer with a delayed read control signal. Based upon the disclosure provided herein, one of ordinary skill in the art will recognize a variety of delay circuits that can be used in relation to different embodiments of the present invention.

A multiplexer 352 controls the signal 356 to be provided to a detector circuit 358, based on a noise scaling mode signal 354. Based on the state of the noise scaling mode signal 354, either the interpolated Y samples 318, the marginalized Y samples 346 or the delayed marginalized Y samples 350 can be provided to the detector circuit 358. The detector circuit 358 is operable to apply a data detection algorithm to the signal 356 from multiplexer 352 to yield a hard decision output 360. In some embodiments of the present inventions, detector circuit 358 is a Viterbi algorithm data detector circuit as is known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Based upon the disclosure provided herein, one of ordinary skill in the art will recognize a variety of data detector circuits that may be used in relation to different embodiments of the present invention. Further processing of servo data fields can be performed as desired on the hard decision output 360, such as, but not limited to, servo address mark detection or Gray code processing.

Signal to noise ratio marginalization can thus be performed in the servo system 300 by increasing the noise scaling applied by scaling factor 336 until the detection fails in detector circuit 358 and data can no longer be correctly retrieved, thereby determining the signal to noise ratio margins of the servo system 300. The scaling factor memory 338 is programmable, enabling a user or tester to control the noise applied to the servo system 300 while supplying test data and comparing the resulting hard decisions 360 to determine whether the test data could be successfully recovered at various noise levels.

Notably, the peak detector 320 is not affected by the added noise level, because the scaled noise added by adder circuit 344 is not fed back to the peak detector 320, which would lead to a poor decision by peak detector 320 and subsequent false noise scaling in a dead loop. Rather, the Y ideals 330 are selected in some embodiments from a lookup table 324 based on the hard decision output 322 from the peak detector 320 and on targets 326. Thus, the noise-scaled, marginalized Y samples 346 are processed only in the detector circuit 358 and are not used in any feedback loop used to derive the Y ideals 330.

Figure 4:
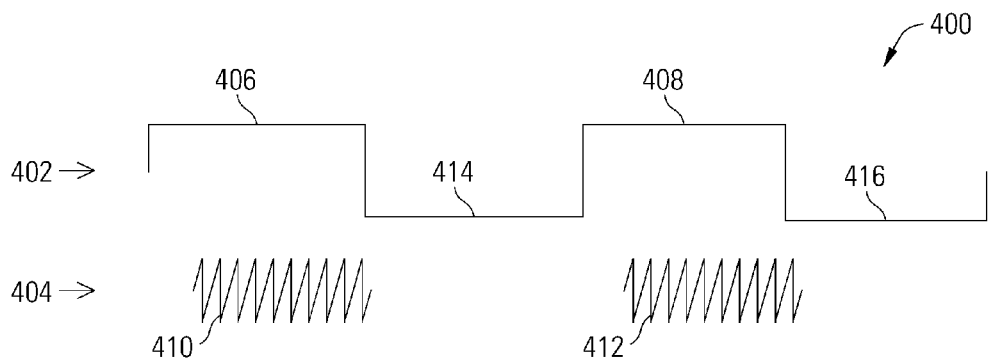
FIG. 4 depicts the hard decision output waveforms of a servo data detector in a servo noise scaling mode that disables marginalization in accordance with some embodiments of the present invention.

Turning to FIG. 4, a plot 400 graphically depicts hard decision output waveforms 404 from a servo data detector, when operating in a servo noise scaling mode (NS_MODE=0) that disables marginalization in accordance with some embodiments of the present invention. A servo gate signal 402 is asserted when a read/write head (e.g., 220) is reading servo data (e.g., 130) from a data track (e.g., 116) on a storage medium (e.g., 100). When the servo gate signal 402 is asserted during servo gate periods 406, 408, the noise scaling mode signal 354 configures the multiplexer 352 to provide the interpolated Y samples 318 to the detector circuit 358. The hard decision output waveforms 404 are an analog representation of the digital data in the hard decision output 360 from detector circuit 358. The hard decision output waveforms 404 thus correspond to un-marginalized servo data 410, 412 during the servo gate periods 406, 408, with no noise added. During the free periods 414, 416 between servo gate periods 406, 408, the read/write head (e.g., 220) is reading user data, and the servo system is not receiving servo data to be processed.

Figure 5:
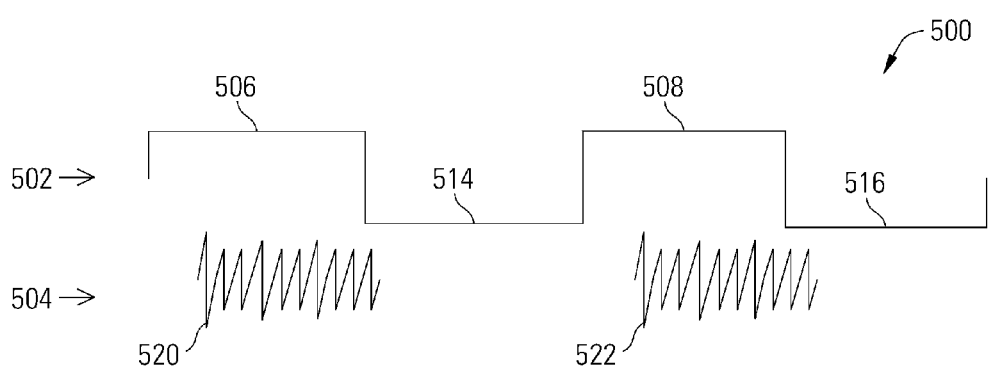
FIG. 5 depicts the hard decision output waveforms of a servo data detector in a servo noise scaling mode that yields a marginalized detector output during a normal servo output period in accordance with some embodiments of the present invention.

Turning to FIG. 5, a plot 500 graphically depicts hard decision output waveforms 504 from a servo data detector, when operating in a servo noise scaling mode (NS_MODE=1) that enables marginalization in accordance with some embodiments of the present invention. A servo gate signal 502 is asserted when a read/write head (e.g., 220) is reading servo data (e.g., 130) from a data track (e.g., 116) on a storage medium (e.g., 100). When the servo gate signal 502 is asserted during servo gate periods 506, 508, the noise scaling mode signal 354 configures the multiplexer 352 to provide the marginalized Y samples 346 to the detector circuit 358. The hard decision output waveforms 504 are an analog representation of the digital data in the hard decision output 360 from detector circuit 358. The hard decision output waveforms 504 thus correspond to marginalized servo data 520, 522 during the servo gate periods 506, 508, with scaled noise added. During the free periods 514, 516 between servo gate periods 506, 508, the read/write head (e.g., 220) is reading user data, and the servo system is not receiving servo data to be processed.

Figure 6:
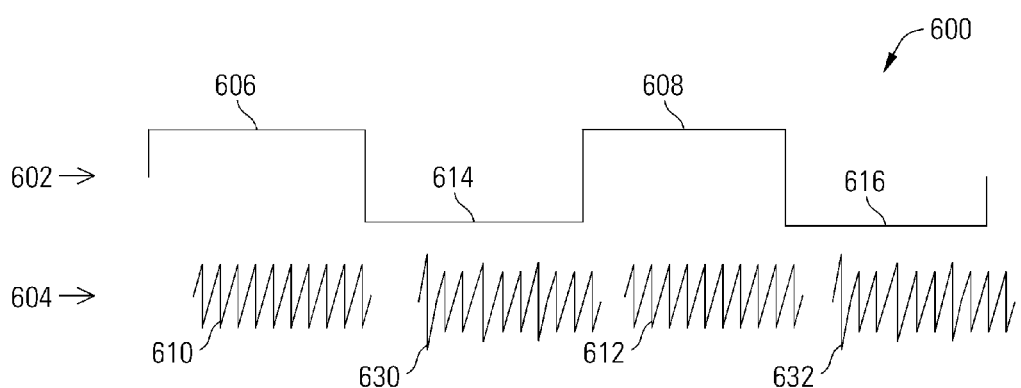
FIG. 6 depicts the hard decision output waveforms of a servo data detector in a servo noise scaling mode in that yields un-marginalized detector output during the normal servo output period and a marginalized detector output between normal servo output periods in accordance with some embodiments of the present invention.

Turning to FIG. 6, a plot 600 graphically depicts hard decision output waveforms 604 from a servo data detector, when operating in a servo noise scaling mode (NS_MODE=2) that enables marginalization in accordance with some embodiments of the present invention. A servo gate signal 602 is asserted when a read/write head (e.g., 220) is reading servo data (e.g., 130) from a data track (e.g., 116) on a storage medium (e.g., 100). When the servo gate signal 602 is asserted during servo gate periods 606, 608, the noise scaling mode signal 354 configures the multiplexer 352 to provide the interpolated Y samples 318 to the detector circuit 358. When the servo gate signal 602 is not asserted, during the free periods 614, 616 during servo gate periods 606, 608, when the read/write head (e.g., 220) is reading user data, and the servo system is not receiving servo data to be processed, the noise scaling mode signal 354 configures the multiplexer 352 to provide the delayed marginalized Y samples 350 to the detector circuit 358. The hard decision output waveforms 504 are an analog representation of the digital data in the hard decision output 360 from detector circuit 358. The hard decision output waveforms 604 thus correspond to non-marginalized servo data 610, 612 during the servo gate periods 506, 508, with no scaled noise added, and to marginalized servo data 630, 632 during the free periods 614, 616 between servo gate periods 606, 608, with scaled noise added.

Figure 7:
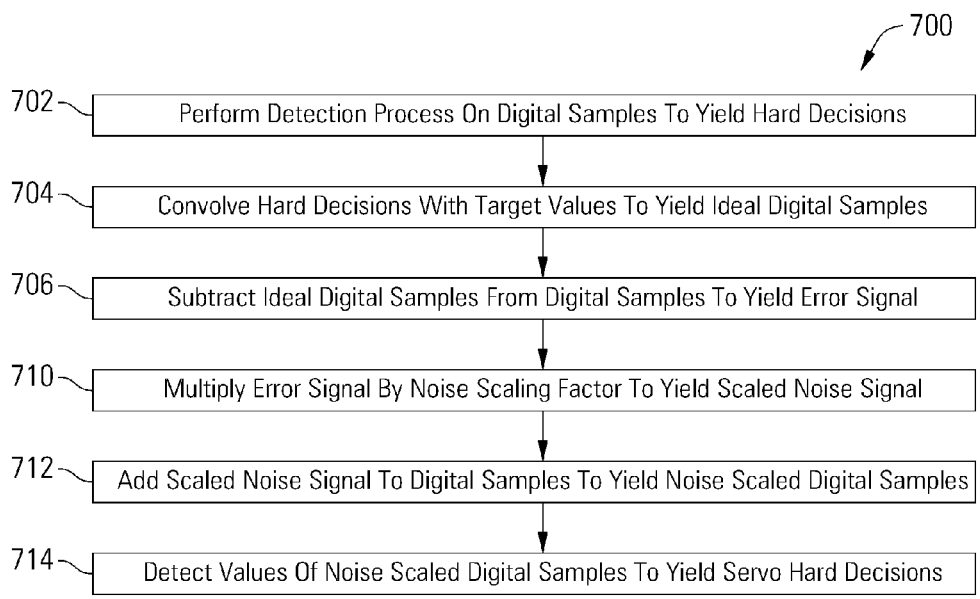
FIG. 7 is a flow diagram showing a method for signal to noise ratio marginalization in a servo system in accordance with some embodiments of the present invention.

Turning to FIG. 7, a flow diagram 700 shows a method for signal to noise ratio marginalization in a servo system in accordance with some embodiments of the present invention. Following flow diagram 700, a detection process is performed on digital samples to yield hard decisions. (Block 702) The digital samples are obtained in some embodiments based on an analog signal read from a servo field of a magnetic hard disk, sampled by an analog to digital converter. In some embodiments, the digital samples are equalized in a digital finite impulse response filter and interpolated in an interpolation circuit to adjust the phase and/or sampling rate of the digital samples. The detection process is a peak detection process in some embodiments, assigning hard decision values by comparing the digital sample values with a threshold value. Notably, the detection process is performed on digital samples which have not had scaled noise added, also referred to as "un-marginalized" digital samples.

The hard decisions are convolved with target values to yield ideal digital samples. (Block 704) In some embodiments, the ideal digital samples are retrieved from a lookup table based on the hard decisions and target values. Notably, the ideal digital samples are not derived from a feedback loop or dead loop to which noise has been added.

The ideal digital samples are subtracted from the digital samples to yield an error signal. (Block 706) The error signal is multiplied by a noise scaling factor to yield a scaled noise signal. (Block 710) The noise scaling factor can be adjusted as test data is processed by the servo system in order to identify the signal to noise ratio margins at which the test data can no longer be successfully retrieved.

The scaled noise signal is added to the digital samples to yield noise scaled digital samples. (Block 712) The values of the noise scaled digital samples are detected to yield servo hard decisions. (Block 714) In some embodiments, the detection comprises a Viterbi algorithm detection process. In some embodiments, multiple operating modes are provided. In one noise scaling mode, un-marginalized digital samples are processed by a Viterbi detector during a normal servo gate period when servo data is being read from the magnetic hard disk. In another noise scaling mode, marginalized digital samples are processed by the Viterbi detector during the normal servo gate period. In another noise scaling mode, un-marginalized digital samples are processed by the Viterbi detector during the normal servo gate period and marginalized digital samples are processed by the Viterbi detector between the normal servo gate periods when the servo system is otherwise free.

By increasing the noise scaling until the detection fails and data can no longer be correctly retrieved, the signal to noise ratio margins of the system can be determined.

It should be noted that the various blocks shown in the drawings and discussed herein may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, apparatuses and methods for servo system signal to noise ratio marginalization. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A servo system comprising:
    a detector circuit operable to apply a data detection algorithm to digital data to yield hard decisions;
    a convolution circuit operable to yield ideal digital data based on the hard decisions and on target values;
    a subtraction circuit operable to subtract the ideal digital data from the digital data to yield an error signal;
    a scaling circuit operable to scale the error signal to yield a scaled noise signal;
    an adder operable to add the scaled noise signal to the digital data to yield noise-added digital data; and
    a second detector circuit operable to apply a second data detection algorithm to the noise-added digital data to yield output hard decisions.

2. The servo system of claim 1, wherein the detector circuit comprises a peak detector.

3. The servo system of claim 1, wherein the convolution circuit comprises a lookup table.

4. The servo system of claim 1, wherein the noise-added digital data is not used to derive the ideal digital data.

5. The servo system of claim 1, further comprising an interpolator circuit operable to generate the digital data from Y samples.

6. The servo system of claim 1, further comprising an equalizer operable to filter the digital data.

7. The servo system of claim 1, further comprising a delay circuit operable to delay the noise-added digital data.

8. The servo system of claim 7, wherein the delay circuit is operable to delay the noise-added digital data until after a servo gate period.

9. The servo system of claim 1, further comprising a multiplexer operable to select an input to the second detector circuit based on a noise-scaling mode.

10. The servo system of claim 9, wherein the multiplexer is operable to select the input to the second detector circuit based on three noise-scaling modes, a first noise scaling mode in which the digital data is provided to the second detector circuit during servo gate periods, a second noise scaling mode in which the noise-added digital data is provided to the second detector circuit during servo gate periods, and a third noise scaling mode in which the digital data is provided to the second detector circuit during servo gate periods and the noise-added digital data is provided to the second detector circuit between servo gate periods.

11. The servo system of claim 1, wherein the second detector circuit comprises a Viterbi detector.

12. The servo system of claim 1, wherein the system is implemented as an integrated circuit.

13. The servo system of claim 1, wherein the system is incorporated in a storage device.

14. A method for determining signal to noise ratio margins in a servo system, comprising:
    performing a data detection process on digital samples to yield hard decisions;
    generating ideal digital samples based at least in part on the hard decisions;
    subtracting the ideal digital samples from the digital samples to yield an error signal;
    multiplying the error signal by a scaling factor to yield a scaled noise signal;
    adding the scaled noise signal to the digital samples to yield noise-added digital samples; and
    detecting values of the noise-added digital samples to yield output hard decisions to determine whether the values can be correctly retrieved with the scaled noise signal.

15. The method of claim 14, further comprising selecting an operating mode for the servo system, wherein during at least one operating mode the values of the noise-added digital samples are detected to yield the output hard decisions during a servo gate period.

16. The method of claim 14, further comprising selecting an operating mode for the servo system, wherein during at least one operating mode values of the digital samples are detected to yield the output hard decisions during a servo gate period.

17. The method of claim 14, further comprising selecting an operating mode for the servo system, wherein during at least one operating mode the values of the digital samples are detected to yield the output hard decisions during a servo gate period and the values of the noise-added digital samples are detected to yield the output hard decisions outside the servo gate period.

18. The method of claim 17, further comprising delaying the noise-added digital samples until after the servo gate period.

19. The method of claim 14, wherein generating the ideal digital samples comprises looking up the ideal digital samples based at least in part on the hard decisions, wherein the hard decisions are not based on the noise-added digital samples.

20. A storage device, comprising:
    a storage medium operable to store user data and servo data;
    a head assembly disposed in relation to the storage medium and operable to read and write data on the storage medium; and
    a servo system operable to test signal to noise ratio margins by generating an error signal based on the servo data and adding noise to the servo data until correct values of the servo cannot detected, wherein the error signal is generated before the noise is added.

* * * * *